July 3, 1962

L. KONRAD 3,041,904

AUTOMATIC LATHE

Filed Nov. 5, 1959

Inventor:
Léon Konrad
by:
Michael S. Striker
Attorney

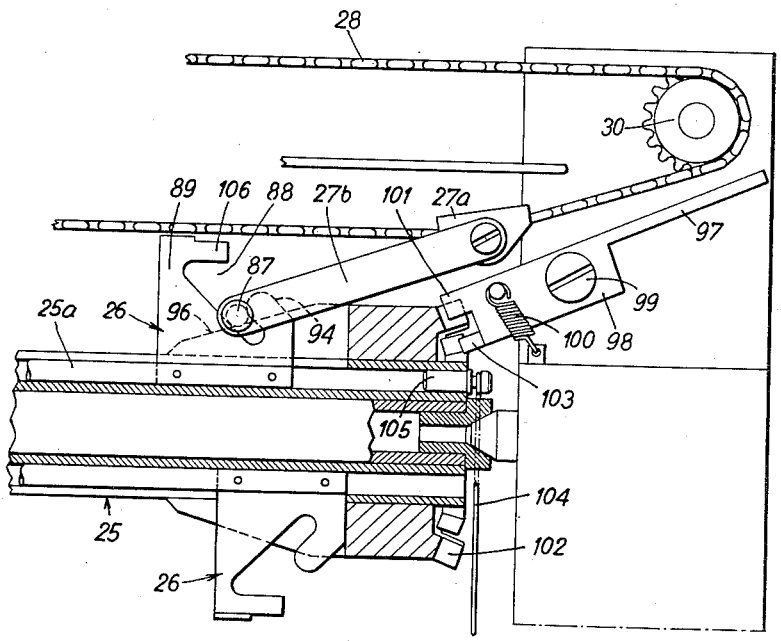
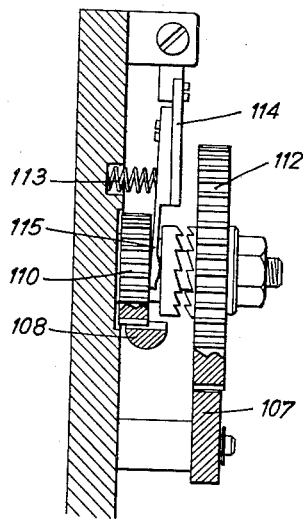

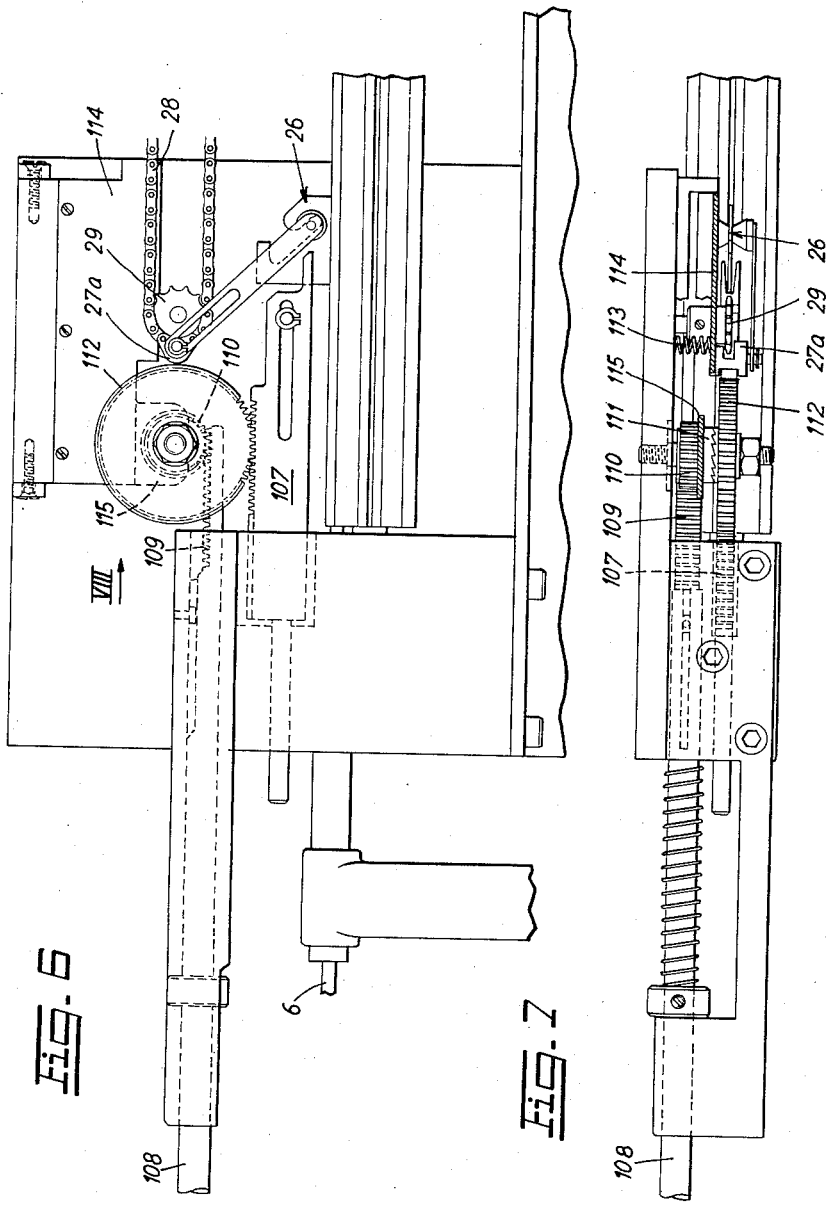

United States Patent Office 3,041,904
Patented July 3, 1962

3,041,904
AUTOMATIC LATHE
Léon Konrad, Evilard, Switzerland, assignor to Usines Tornos, Fabrique de Machines Moutier S.A., Moutier, Switzerland, a joint stock company of Switzerland
Filed Nov. 5, 1959, Ser. No. 851,185
Claims priority, application Switzerland Nov. 6, 1958
6 Claims. (Cl. 82—2.7)

This invention relates to automatic lathes and in particular to lathes with a sliding head stock.

In the lathes of this type known in the art the feed bars rotate on themselves and move forward into the operating field of the tools which work series of identical pieces at their foremost end. These two motions of the feed bars are controlled by the head stock itself which comprises a rotary spindle and which is slidably mounted on the framework of the lathe. To hold the foremost portion of these feed bars satisfactorily at the moment at which the tools begin their working operation at the front part of the work pieces it does not suffice that the feed bar is merely held by the head stock chuck. With this type of lathe the work pieces have indeed very often a length several times greater than their diameter and the feed bar portion protruding in front of the head stock chuck would not resist to the transverse thrust of the radial tools of the lathe. The automatic lathes of this type known in the art are therefore provided with a sleeve mounted in front of the headstock. This sleeve holds the front portion of the feed bars which protrudes from the head stock chuck, and the radial tools of the lathe work immediately before this sleeve through which the head stock moves the feed bars progressively during the machining operations of the work pieces.

Now although several types of feeding devices have already been provided in lathes with a fixed head stock to introduce automatically the successive feed bars into the head stock without stopping the lathe and without requiring the help of a worker every time a new feed bar must be set in place, there was some difficulty to provide sliding head stock lathes with a feeding device which can operate automatically. Although the feed bars can be worked wholly with fixed head stock lathes and although the new feed bar can thus push the remaining portion of the preceding bar through the head stock, this operation is no longer possible in a lathe with a sliding head stock. In the latter the remaining bar portion which cannot be worked furthermore has a length which is at least equal to the sum of the length of the sleeve and of the distance between the latter and the head stock chuck. Since there are no other means than the head stock to rotate and to drive the feed bars forward, the head stock cannot push the remaining portion of the bar farther than the foremost portion of its chuck. Now should it be desirable to eliminate the remaining portion of the feed bar which cannot be worked furthermore by pushing it forward for instance by means of the new feed bar, a quite particular operation cycle should be provided at the very moment at which the feed bar must be changed. With the sliding head stock lathes the feed bar stop, against which the bars rest during the opening of the head stock chuck, is generally constituted by the tool which cuts the work pieces from the bar. Now if the remaining bar portion which cannot be worked furthermore should be eliminated in front of the lathe the cutting tool should previously be removed from the path of this bar portion at the moment at which a new bar must be set into the head stock. Eliminating the remaining portions of the feed bar this way would still have another drawback. The sliding head stock lathes known are indeed provided generally with an auxiliary apparatus mounted in front of the head stock and this auxiliary apparatus is carrying tools such as drills, borers, taps and dies to carry out machining operations in the head stock axis. Now should the remaining feed bar portion be pushed forward through said sleeve, this portion is often so long that the said auxiliary apparatus should be moved away through a long path. Eventually the elimination considered of the remaining feed bar portions would still encounter a further drawback, in particular in the case of small lathes provided for machining bars having a diameter smaller than a tenth of an inch. In such cases the distance between the head stock chuck and the lathe sleeve is indeed several times greater than the bar's diameter and pushing one bar by means of the next one would cause one of said bars to bend aside so that the foremost end of the new bar would pass at the side of the remaining bar portion rear end without pushing said portion through the lathe sleeve. In view of these difficulties the manufacturers have always provided their lathes so that the remaining feed bar portions, which cannot be worked furthermore, can be eliminated by pulling them backwards.

In its copending application Ser. No. 829,149 the assignee disclosed an automatic feeding device for sliding head stock lathes of the type indicated above. This automatic feeding device comprises means arranged for pulling the remaining feed bar portions backwards until they come at the rear end of the guiding tube where these portions are then eliminated. The device disclosed in the abovementioned patent application therefore comprises a chuck at the front end of the pusher resting on the rear end of the bar to hold it against the cutting tool when the head stock chuck opens and moves backward to catch the bar again between two successive operation cycles of the lathe. This pusher, which is thrust forward by means of a weight, is moved backward by means of a servo-motor which becomes operative when a new bar must be introduced into the guiding tube mentioned above. Since said servo-motor is only operative from the moment at which the pusher must be moved backward until the latter comes to its rearmost position, this motor can be made strong enough to remove the bar portion engaged in the lathe sleeve.

Automatic lathes in which the said pusher is driven forward and backward by means of an endless chain controlled by a servo-motor are however also known in the art. In these cases the servo-motor is always in operating condition. It is constituted by an asynchronous motor with a great frequency drift which can thus be maintained at rest during relatively long periods without any risk of damage. The motors of this type which are well known in the art have a starting couple which is relatively great. Since the motor has however to remain at rest during relatively long time periods it must be small enough and it may occur that such a motor cannot pull the remaining bar portions backward while removing them from the lathe sleeve.

It is therefore an object of this invention to help said servo-motor pulling the remaining feed bar portions backward and removing them from the lathe sleeve.

Another object of this invention is to use the backward motion of the head stock to help said servo-motor.

Still further objects of the invention will become apparent in the course of the following description.

The two embodiments of the automatic lathe according to the invention are represented diagrammatically and by way of example in the drawings annexed to this specification.

In the drawings:

FIG. 5 is an elevational view on a greater scale with some parts in section of the rear end of the feeding device of FIG. 1;

FIG. 6 is an elevational view analogous to that of FIG. 3 showing some details of the second embodiment;

FIG. 7 is a plan view of the elements shown in FIG. 6, and

FIG. 8 is an end view in the direction of arrow VIII of FIG. 6 with some parts in section.

Figure 1:
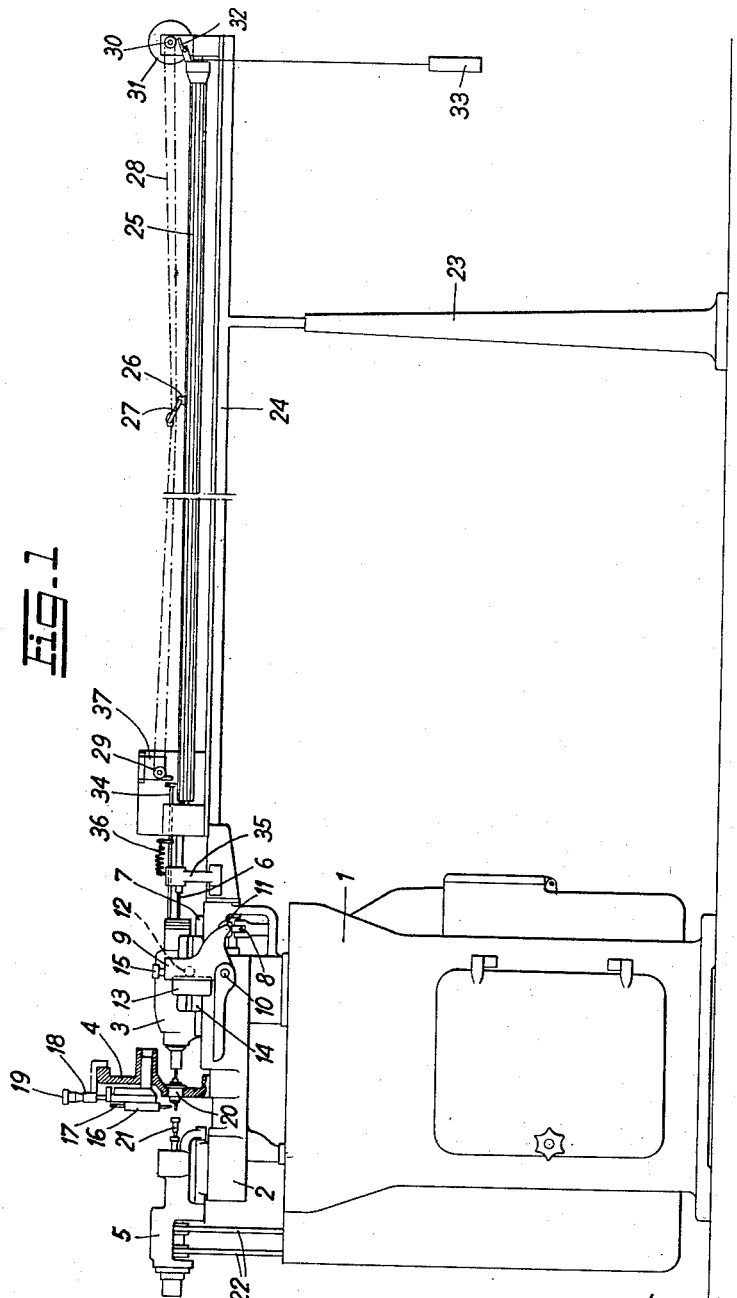
FIG. 1 is a general and simplified view in elevation of an automatic lathe provided with an automatic feeding device.

The lathe represented in FIG. 1 comprises a stand 1 in which the chief motor of the lathe is mounted, said motor driving the head stock and every tool of the lathe by means known in the art. The stand 1 carries a framework 2 on which a head stock 3, a support 4 and an auxiliary apparatus 5 are mounted. The head stock 3 comprises a spindle driven in rotation from the chief motor of the lathe by means of a belt (not shown) passing through the framework 2 and set on a pulley (not shown) fixed to said spindle for rotary movements. The spindle itself comprises a chuck capable of gripping a feed or stock bar 6 so as to drive said bar in rotation and to move it in axial direction. To ensure this last motion the head stock 3 is mounted on an axial slide 7 of the framework 2 and it is set under the action of a very strong return spring urging said head stock backward i.e. towards the right in FIG. 1. The forward motion of the head stock 3 is controlled by a cam-shaft extending in parallel with the lathe on the backside thereof. To actuate the head stock 3 this cam-shaft carries a cam (not shown) cooperating with a lever 8 pivoting around an axis parallel to the lathe's axis, said lever extending from the rear side of the framework 2 to the front side thereof. A crank lever 9 located on the front side of the lathe is pivotally mounted on a trunnion 10 and this crank lever is set under the action of lever 8. At one of its ends this lever 8 carries a finger which always remains in contact with said cam and at its other end said lever is in contact with a roller 11 mounted for rotary motions at the end of one arm of lever 9. The other arm of this lever 9 carries a pin 12 against which a plate 13 fixed to the body member of the head stock is permanently bearing under the action of the head stock return spring. To set exactly the two extreme positions of the head stock 3 the body member of the latter carries a slide 14 on which the plate 13 is mounted. Moreover the lever 9 carries a regulating screw 15 which permits of adjusting the position of pin 12 along the corresponding crank lever arm so as to set the length of the axial displacement of the head stock.

The support 4 mounted on framework 2 carries slides in which blocks 16 are mounted. Tools 17 are fixed to the latter so that they extend fanwise substantially in a radial direction with respect to the bar 6. The blocks 16 are moved along their slides upward by means of strong return springs (not shown) and downward by means of levers 18 carrying micrometric regulating screws 19 enabling an exact adjustment of the end position of tools 17. To avoid bending of the bar portion extending in front of the head stock 3 when the tools 17 come in working position, the support 4 carries a sleeve 20 which can be fixed or can comprise a moving part and the bar 6 is carried in this sleeve.

The fanwise arranged tools 17 thus enable machining the side faces of the work pieces at the end of bar 6. While these tools are only moving forward and then backward radially with respect to the bar, the head stock 3 drives the latter in rotation and moves it forward under said tools through the sleeve 20.

While tools 17 enable machining the lateral faces of the work pieces at the end of bar 6 further tools carried by the auxliary apparatus 5 enable machining operations coaxially to said pieces from the front end thereof. The tools of apparatus 5 can be drills, borers, taps or die stocks as one of which is shown at 21. Each of these tools is mounted in a rotary spindle of apparatus 5 which carries a movable element carrying all the spindles of said apparatus. This movable element is arranged so that it can bring every spindle successively into the head stock axis. Said element of apparatus 5 can therefore either be a rocker or a revolver drum. When one of the tools of apparatus 5 must come in working position, a cam (not shown) carried by the cam-shaft mounted behind the framework 2 first moves the spindle of this tool into the head stock axis. Another cam of said camshaft moves then a lever which urges the spindle being now coaxial to the head stock toward the work piece. Like tools 17 the tools of apparatus 5 successively come in working position in accordance with a pre-determined cycle for every work piece. One tool of apparatus 5 and one tool 17 obviously can work at the same time. The tools of apparatus 5 can be held immobile since bar 6 is driven in rotation by the head stock 3. They can however also be driven in rotation for instance by means of the belts 22 either in the same direction or in the other direction as bar 6.

At the end of the operation cycle of tools 17 and of the tools of apparatus 5 one of the tools 17 is moved across the bar axis to cut the work piece which has just been machined at the end of this bar. After its cutting operation this tool 17 remains in its foremost position until the lathe is ready for beginning a new operation cycle. Before this, the head stock chuck, which came in its foremost position, opens and the head stock 3 moves backward under the action of its return spring through a path having a length exactly equal to that of the work pieces. When this head stock 3 has come in its rearmost position its chuck closes and grips bar 6. The lathe is then ready for machining a new work piece. It suffices therefore that the cutting tool 17, which was still in working position, moves out of the path of bar 6 to enable the head stock 3 moving this bar forward through the sleeve 20 so as to set the foremost end thereof into the operating field of tools 17 and of the tools of apparatus 5.

Since the bars 6 are relatively long with respect to their diameter a guiding and feeding device is associated to the lathe described as shown in FIG. 1. This guiding and feeding device is mounted on a pillar 23. It comprises a framework 24, the front end of which is carried by the framework 2 of the lathe. A revolver drum 25 is pivotally mounted on this framework 24. This drum comprises a plurality of guiding tubes, each of which may contain a feed bar, said guiding tubes thus forming a magazine. The tube of drum 25 which is in the uppermost position of this drum is also located coaxially to head stock 3 and it guides and carries the bar 6 on which the lathe is just working. The guiding and feeding device described furthermore comprises a pusher 26 in each tube of the said drum. Each of these pushers is constituted by a rod extending within one of the tubes of drum 25 and by a plate extending across a longitudinal slot of said tubes. A driving member 27 is connected to the plate of the pusher 26 which is carried by the tube being in the uppermost position of drum 24, and this driving member 27 urges said pusher against the rear end of bar 6. To avoid any backward motion of said bar together with the head stock 3 at the end of an operation cycle of the lathe and to maintain said bar in contact with the cutting tool, the pusher 26 must exert a sufficient thrust on said bar toward the left in FIG. 1. The driving member 27 therefore is carried by an endless chain 28 mounted on a pair of chain wheels 29, 30 located at the front end and at the rear end, respectively, of said guiding device. This chain 28 is always driven in the same direction by means of a servo-motor 31 which is preferably constituted by a small asynchronous motor having a great frequency drift (almost 20 percent). This motor of a well known type thus exerts a relatively strong thrust on the chain 28 when the latter is to be moved. Moreover this motor can remain at rest without any damage during relatively long periods without breaking its energizing circuit. The motor 31 thus drives the chain 28 as soon as the pusher 26 enables member 27 moving toward the left in FIG. 1, i.e. as soon as the head stock is moving forward. In other words as long as bar 6 is in working position the pusher 26 always bears with a predetermined force against this bar. When the latter has been machined entirely, the member 27 passes around wheel 29 and the motor 31 starts then pulling the pusher 26 backward until it comes in a rearmost position described hereinafter. At that moment the driving member 27 leaves the pusher and passes around wheel 30 while actuating the releasing lever 32 which enables the drum 25 moving one step forward under the action of a weight 33 in a manner described hereinafter. After this motion of drum 25 the next tube thereof comes then in the upmost position and the driving member 27 catches the pusher of this new tube when the motor 31 has carried said member around wheel 30 and urges it forward again toward the left of FIG. 1.

Although the motor 31 is exerting a relatively great driving couple on member 27, this couple does however not suffice to remove from the sleeve 20 the remaining stock bar portion, which cannot be machined furthermore, when the chain 28 starts pulling the member 27 backward after said member has been carried around wheel 29. As described in detail hereinafter the head stock 3 helps the servomotor 31 when the remaining stock bar portions must be removed from the sleeve 20. The lathe comprises therefore a sliding rod 34 shiftably mounted in a support 35 fixed to the framework 2. A return spring 36 provided between the support 35 and the rod 34 maintains the latter in contact with the rear face of a shoulder of the head stock body member. That means that the rod 34 follows the axial displacements of the head stock 3. A device 37 disclosed hereinafter in detail is arranged so as to transmit the backward motions of rod 34 to the pusher 26 at the moment at which member 27 starts pulling this pusher backward i.e. at the moment at which this pusher has to remove the bar 6 from sleeve 20.

The bar portions removed in the manner described from sleeve 20 and from head stock 3 are brought at the rear end of the corresponding tube of drum 25 where they are remaining since the following forward motion of member 27 drives another pusher with a new bar.

When all the bars of drum 25 have been machined the pushers of each of these tubes are then in their rearmost position each with a remaining bar portion which cannot be machined furthermore. The lathe must then be stopped and these remaining bar portions have to be replaced manually by new bars in order to enable the lathe working again in an entirely automatic manner during a relatively long period.

Figure 2:
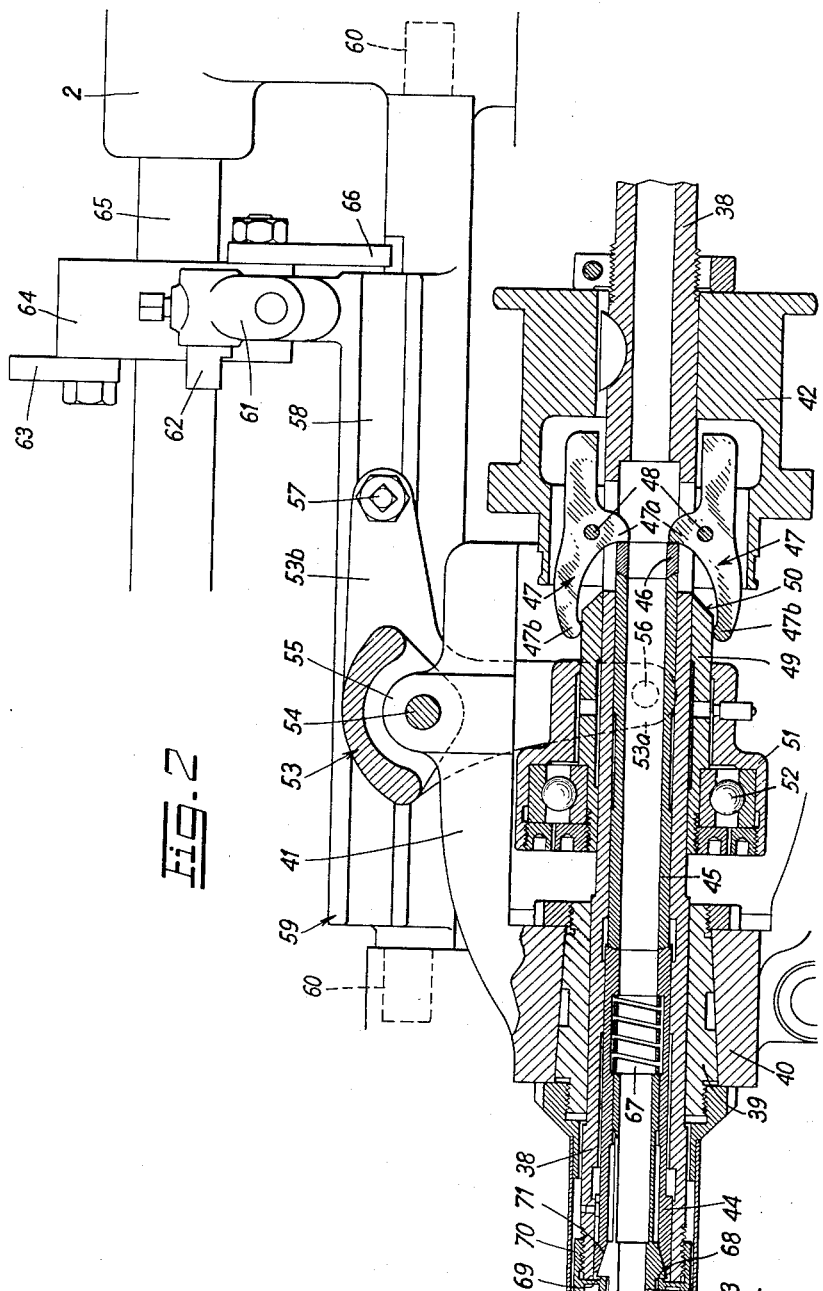
FIG. 2 is a plan view with cut portions and on a greater scale of a part of the lathe of FIG. 1.

To ensure the functions described above the head stock is provided as shown in FIG. 2 with a rotatable spindle 38 pivoted, on the one hand, in a front sleeve 39 carried by a front portion 40 of the body member 41 of the head stock 3, and, on the other hand, in an analogous rear sleeve carried by a rear portion (not shown) of the body member 41 of said head stock. The spindle 38 is driven in rotation by means of a pulley 42 which is keyed thereonto and it carries a chuck 43 comprising three resilient gripping parts. Closing and opening the chuck is ensured by sleeves 44, 45 and 46 set behind one another within spindle 38, said sleeves being themselves under the action of two pawls 47, which pivot about pins 48 carried by the spindle 38. The pawls 47 are provided each with a nose 47a in contact with the rear face of sleeve 46 and with a tail portion 47b bearing on a sleeve 49 shiftably mounted on the spindle 38 and provided with a truncated conical end face 50. A second sleeve 51 surrounds the sleeve 49. Whereas the latter rotates together with the spindle 38, the sleeve 51 always remains in the same position around the axis of said spindle. Both sleeves 49 and 51 are, however, connected to one another for axial displacements by means of a ball bearing 52. Although the sleeve 49 is fitted friction-tight on to the spindle 38 so as to rotate therewith, it nevertheless can be moved axially with respect thereto. These axial displacements of sleeves 49 and 51 are ensured by a rocker 53 pivoted around a vertical axle 54 engaged in a support 55 integral with the body member 41 of the head stock 3. Besides the two flanges 53a which pass over sleeve 51 and thereunder, respectively, and which carry pins 56 engaging sleeve 51, the rocker 53 is provided moreover with an arm 53b formed with a spherical portion 57 at its end. This portion 57 engages a groove 58 of a rocker 59 so as to form a hinge therewith. The rocker 59 is formed with pivots 60 journalled in bearings carried by supports integral with the framework 2 of the lathe so that said rocker may pivot around an axis extending in parallel to that of the head stock. The rocker 59 is provided moreover with an upper arm 61 carrying a pin 62, which can be actuated by an ear 63 of a cam 64 fixed on to the cam-shaft 65 located behind the framework 2 of the lathe, and with a lower arm (not shown) also carrying a pin which can be actuated by an ear 66 of cam 64. A very strong spring 67 is eventually interposed between the chuck 43 and the sleeve 44 to push these two pieces away from one another and to permit of opening the chuck 43. In the position represented in FIG. 2 the spring 67 holds a front shoulder 68 of the chuck 43 in abutting contact with an inner rim 69 of an end piece 70 screwed on to the front end of the spindle 38. This spring 67 is held in bent or compressed condition by the pawls 47 which hold the sleeves 46, 45 and 44 in such an advanced position that the inward truncated conical end face 71 of sleeve 44 bears against a corresponding surface of the chuck 43 and closes the latter on the stock bar. The chuck 43 gets opened when the ear 63 of the cam 64 engages the pin 62 of the upper arm 61 of rocker 59 and causes the latter to rock in such a manner that its groove 58 moves towards the head stock axis. This movement of rocker 59 causes the rocker 53 to rock clockwise in FIG. 2 about its axle 54 and the pins 56 carried by flanges 53a of rocker 53 to move the sleeves 51 and 49 forward thus enabling the tail portions 47b of pawls 47 to move toward the axis of spindle 38. When the sleeve 49 is moving forward, the tail portions 47b actually fall on the spindle 38 under the action of spring 67, which pushes the sleeves 44, 45 and 46 against the noses 47a of pawls 47. This rocking motion of pawls 47 thus enables the spring 67 to separate the truncated conical surface 71 of sleeve 44 from the corresponding surface of chuck 43. The latter gets closed again at the moment at which the ear 66 of cam 64 engages the pin of the lower arm (not shown) of rocker 59 and moves the latter in such a manner that its groove 58 comes back in the position represented in FIG. 2. This rocking motion of rocker 59 causes the rocker 53 to rock correspondingly around its axle 54 and the sleeves 49 and 51 to come back to their original position. During this last motion the truncated end face 50 of sleeve 49 passes under the tail portions 47b of pawls 47 and causes the latter to rock back into their original positions. This motion of pawls 47 also urges the sleeves 46, 45 and 44 into their original positions toward the front end of spindle 38, the truncated conical surface 71 of the foremost sleeve thereby engaging again the corresponding surface of chuck 43. The means controlling opening and closing the chuck 43 remain in the two corresponding positions described above by friction, and more particularly by the friction of sleeve 49 on spindle 38. This friction is still increased in closed position of the chuck 43 by the pawls 47, the tail portions 47b of which strongly bear on the sleeve 49 under the action of spring 67 which has a rectangular cross section.

The ears 63 and 66 of cam 64 are arranged in such a manner around the cam-shaft 65, with respect to the cam which actuates lever 8 (FIG. 1), that ear 63 causes the chuck 43 to get opened at the moment at which the cam controlling the lever 8 is going to permit the head stock 3 of moving backward under the action of its return spring, and that ear 66 causes chuck 43 to get closed at the moment at which the head stock 3 has come in its rearmost position under the action of said return spring.

Figure 3:
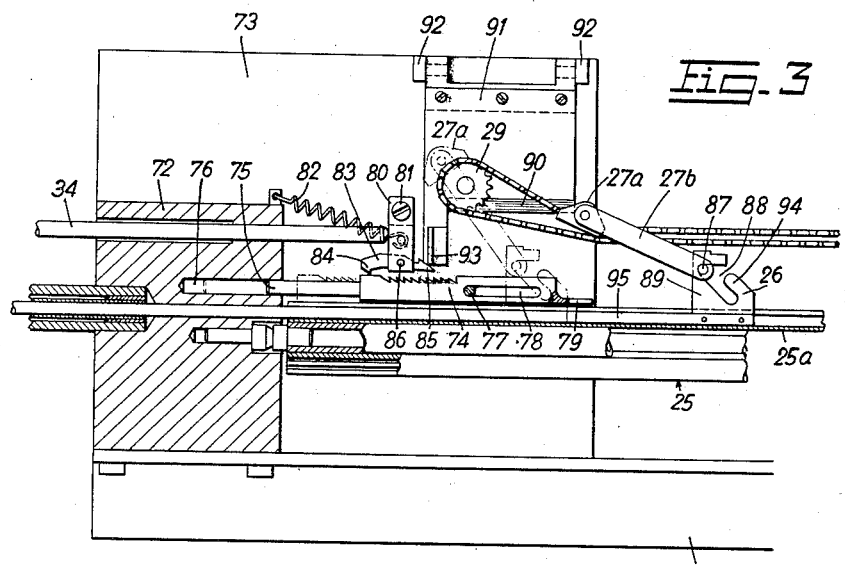
FIG. 3 is an elevational view on a greater scale with some parts in section of a portion of the lathe of FIG. 1 showing some details of the first embodiment.
Figure 4:
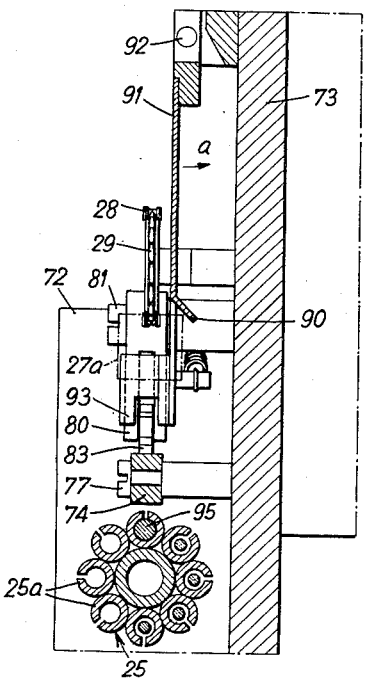
FIG. 4 is a view from the right of FIG. 3.

FIGS. 3 and 4 show the details of the device 37 according to the first embodiment. FIG. 3 shows in particular that the sliding rod 34 is partly guided in a block 72 of a support 73 fixed to the framework 24 of the guiding device, this support 73 carrying the elements of device 37.

This device 37 first comprises a toothed rack 74 mounted above the drum 25 and guided by the rod portion 75 carried in a blind hole 76 of block 72. The axial displacements of this rack 74 are limited by a pin 77 entering a slot 78 of rack 74. The rear end of the latter is cut so as to form a fork 79. To actuate this rack the device 37 comprises a lever 80 pivotally mounted around a screw 81. This lever is set under the action of a spring 82 which maintains said lever in abutting engagement with the rear end of rod 34 following the axial movements of the head stock 3. At its free end this lever 80 carries a pawl 83 having two noses 84 and 85. Whereas nose 84 cooperates with rack 74 to move it backward, nose 85 is provided for keeping the pawl 83 inoperative.

Since rod 34 acts on lever 80 at a point which is almost at the same distance of the pivot 86 of pawl 83 and of the screw 81 around which lever 80 is mounted pivotally, this pivot 86 and consequently the nose 84 of pawl 83 move almost through a path twice as long as that of the head stock.

During the operation of the lathe the lever 80 oscillates between two extreme positions during every operation cycle since the head stock moves from its rearmost position to its foremost position and comes then back again to the rearmost position during each cycle. Nose 84 of pawl 83 thus maintains the rack 74 in the position represented in full lines in FIG. 3 which is the rearmost position of this rack.

When the stock bar has almost been machined entirely, the pusher 26 of the upper guiding tube 25a comes once in the position represented in full lines in FIG. 3. This FIG. 3 shows also that the pusher 26 is pulled forward by the endless chain 28 by means of driving members comprising a link 27a fixed to the chain 28 and an arm 27b jointed to the link 27a and carrying a pin 87 located in an opening 88 of the plate 89 of pusher 26. In the position represented in full lines in FIG. 3 the link member 27a comes just in contact with an inclined portion 90 of a plate 91 pivotally mounted at 92 on the support 73 of device 37. This link member 27a thus tends to cause the plate 91 rocking in the direction of arrow a in FIG. 4.

This plate 91 carries a locking fork 93 one branch of which enters the path of nose 85 of pawl 83. As soon as the link member 27a has rocked plate 91 in the manner described above, the fork 93 causes the pawl 83 to pivot clockwise in FIG. 3 every time the lever 80 is pushed backward against the action of its spring 82 by rod 34 which moves together with the head stock 3. The pawl 83 is thus prevented from moving the rack 74 as long as the link member 27a is in contact with plate 91, i.e. as long as member 27a moves around the chain wheel 29.

During this motion of link member 27a the pusher 26 and its driving members carried by chain 28 come once in the position represented in dot-and-dash lines in FIG. 3 in which the pusher 26 has reached its foremost position. Before said pusher comes in the latter position its plate 89 enters however the fork 79 formed at the rear end of rack 74. When said plate 89 is fully engaged into said fork, the pusher drives the rack until the latter comes in the position represented in dot-and-dash lines in FIG. 3. In this position the toothing of the rack is located under the nose 84 of pawl 83 but this nose cannot catch it as yet since the nose 85 of the pawl 83 is pushed downward by the fork 93 of plate 91 every time the lever 80 moves counter-clockwise in FIG. 3 during the backward motion of head stock 3.

Once the pusher 26 has reached the position represented in dot-and-dash lines in FIG. 3, it does no longer oppose any resistance to the forward motion of chain 28 under the action of the servo-motor 31. This chain 28 can thus move on freely until the link member 27a has been carried around the wheel 29 and until it has moved backward along the lower portion of chain 28 so far that it begins pulling the pusher 26 backward. When said driving member urges the pusher 26 backward, the pin 87 is engaged in the lower portion of opening 88 of plate 89 behind the nose 94 of this plate.

In order to enable removing the remaining bar portion from the sleeve 20 and from the head stock 3 the rod 95 of pusher 26 must obviously be fixed to the stock bar. Its foremost end can for this purpose be made in the manner described in the copending application mentioned above.

As soon as the members driving pusher 26 start pulling the latter backward they prevent chain 28 from moving at least until the lathe comes to the end of an operation cycle, i.e. until the head stock chuck gets opened. At that moment the pusher 26 could move backward along the tube 25a while driving the remaining stock bar portion to which it is fixed. Since the front portion of said stock is frictionally engaged in sleeve 20 of the lathe, the servo-motor is usually too weak as already mentioned above to remove said bar portion from the sleeve.

In its new position the link member 27a has however released the plate 91 so that the pawl 83 can move the rack 74 again. The first time the head stock 3 is moving back after the member 27a has been carried around wheel 29 the pawl 83 catches the rack 74 and urges the latter backward under the action of rod 34 which is pushed by the head stock 3. This backward motion of rack 74 pushes the plate 89 of pusher 26 backward twice as much as the head stock is moving itself in that direction.

Should the motor 31 still be too weak to drive the pusher 36 backward and should then the chuck 43 get closed on the stock bar 6 which is still engaged in the lathe's sleeve, this lathe would go through a whole cycle of operations during which the remaining stock bar portion would be moved forward again through a distance equal to the travelling path of the head stock. When the head stock chuck opens again, said remaining stock bar portion is in a position situated at a distance of that which it occupied at the end of the preceding operation cycle equal to the travelling path of the head stock. When the head stock moves back at the end of the last cycle, the rod 34 causes the rack 74 to move backward again twice as much as the head stock. Should now the servo-motor 31 still be unable to remove the remaining stock bar portion from the sleeve 20 the lathe would have to go through a new operation cycle.

After each cycle the remaining stock bar portion is more and more disengaged from the sleeve 20 since it moves back at the end of each cycle almost twice as much as it moves forward during these cycles. After a certain number of such cycles (said number depending on the length of the sleeve 20 and of the work pieces) the stock bar remaining in the sleeve will be disengaged therefrom and the motor 31 will then be able to pull it backward.

FIG. 5 shows the driving members of pusher 26 at the moment at which they are coming in their rearmost position, where link member 27a starts moving around the chain wheel 30. This last figure shows that pin 87 of arm 27b comes then in contact with a camming surface 96 formed at the rear end of drum 25. This camming surface 96 lifts pin 87 out from engagement with nose 94 of the pusher plate 89, when the latter is for instance in the position shown in the lower part of FIG. 5. Link member 27a and arm 27b are then moving on alone with chain 28 under the action of motor 31. During this motion link member 27a engages the tail portion 97 of a releasing lever 98 pivotally mounted on a screw 99 and causes this lever 98 to rock against the action of spring 100, so that the projection 101 moves out of toothing 102 provided at the rear end of drum 25. Before projection 101 of lever 98 completely releases the toothing 102, another projection 103 of lever 98 enters however said toothing 102 so as to permit drum 25 of rotating only half a step forward, when projection 101 leaves toothing 102.

The rotary motion of drum 25 is controlled as indicated above by a weight 33 connected by means of a thread 104 to a gudgeon 105 set in one of the tubes of drum 25. As soon as link member 27a leaves the tail portion 97 of lever 98, the latter comes back to its position shown at FIG. 5 under the action of spring 100 and its projection 101 engages toothing 102 again, whereas projection 103 releases it. At that moment the drum 25 moves half a step forward again, until its next tube comes in the upmost position. After having been carried around wheel 30, link member 27a moves then forward along the upper portion of chain 28 and pin 87 of arm 27b enters the opening 88 of the pusher mounted in this new upper tube, and comes under the upper nose 106 of pusher plate 89 so as to pull said pusher forward. The motor 31 drives thus the new stock bar until the front end thereof has moved across the head stock spindle and the sleeve 20 and comes in abutting engagement with the cutting tool described above.

The second embodiment shown at FIGS. 6-8 inclusive only differs from the first one by some members of the device transmitting the backward movements of the head stock to the pusher of the stock bar, when the latter has to remove the remaining stock bar portion from the lathe's sleeve. In this second embodiment the device in question also comprises a rack 107 shiftably mounted in the same manner as in the first embodiment and the head stock also actuates this rack by means of a rod 108. Instead of pushing a lever this rod 108 is here however provided with a toothing 109 meshing with a pinion 110. The latter is connected by means of a crown toothing 111 to a wheel 112 being in meshing relation with rack 107. As in the first embodiment the relative diameters of pinion 110 and wheel 112 are chosen approximately so that the rack 107 is moving back twice as much as the head stock, when the latter moves from its foremost position to its rearmost position at the end of an operation cycle.

FIG. 7 still shows that the crown toothing 111 is cut in such a manner that pinion 110 can only drive wheel 112 when rod 108 moves backward. When the latter is moving forward, the toothings of the corresponding toothed portions of gears 110 and 112 slide over one another while bending spring 113 as may be seen in FIG. 8.

To leave the rack 107 in advanced position, when the pusher 26 approaches its former position, the device shown at FIGS 6-8 also comprises a rocking plate 114 analogous to plate 91 of the first embodiment, and this plate is actuated by link member 27a as in the first embodiment. As long as the link member remains in contact with plate 114, the ear 115 of the latter moves pinion 110 out of engagement with the crown toothing of wheel 112. During all the time the plate 114 remains in said rocked position, the pinion 110 further rotates under the action of rod 108, but it no longer drives either wheel 112 or rack 107. It is only when link member 27a has been carried around the chain wheel 29 and is moving backward, that pinion 110 is released to the action of spring 113 which urges it toward the wheel 112 to transmit the motion of rod 108 to the rack 107.

Although I have described in detail two embodiments of my invention, it should be understood that many changes in the shape, sizes and arrangement of parts could be resorted to within the scope of the appended claims without departing from the spirit or sacrificing the advantages of the invention.

I claim:
1. In an automatic lathe, the combination of: a sleeve; a sliding head stock arranged for catching a stock bar, driving said stock bar in rotation, feeding the same through said sleeve, releasing it, moving back and catching it again; a guiding device behind said head stock to guide and support stock bars fed thereby; pushing means arranged for bearing against the rear end of stock bars fed by said head stock, and for preventing said stock bars from any backward motion when the head stock releases them and moves backward; a servo-motor exerting a predetermined thrust on said pushing means both for causing said pushing means to bear against the rear end of stock bars fed, and for pulling them back to a rearmost position when one of said stock bars has been worked out; means arranged for connecting said pushing means to stock bars fed with respect to axial motion; and means arranged for transmitting the backward motions of said head stock to said pushing means when the latter are in their foremost position.

2. The combination of claim 1, said transmitting means being arranged for causing said pushing means to move backward through a way longer than that of said head stock.

3. The combination of claim 1, said transmitting means comprising one-way clutch means.

4. In a lathe according to claim 1, an endless chain driven by said servo-motor always in the same direction and moving said pushing means successively forward from a rearmost position to a foremost position, and backward from said foremost position to said rearmost position, and a control member fixed to said chain and acting on said transmitting means so as to render them inoperative when said pushing means move forward and approach their foremost position and so as to release said transmitting means and to render them operative when said pushing means have reached their foremost position.

5. The combination of claim 1, said transmitting means comprising: a slidable rack arranged for urging said pushing means backward when they are near their foremost position; a lever pivotally mounted on a fixed axis; a pawl pivotally mounted on said lever and arranged for actuating said rack upon a rocking motion in one direction of said lever; and a slidable member following the axial displacements of said head stock, said member acting on said lever at a point nearer to said fixed axis than said pawl.

6. The combination of claim 5, said rack being movable axially between a rearmost position in which said pawl tends to keep it and a foremost position in which said pushing means drives it when they are coming in their foremost position, a control member moving together with said pushing means, locking means actuated by said control member so that they keep said pawl inoperative when said pushing means moves said rack from its rearmost to its foremost position, and so that they release said pawl once said pushing means have reached their foremost position and are pulled back by said servomotor.

References Cited in the file of this patent

UNITED STATES PATENTS

| | | |
|---|---|---|
| 2,343,914 | Lloyd | Mar. 14, 1944 |
| 2,376,476 | Chatelain | May 22, 1945 |
| 2,848,786 | Kendall | Aug. 26, 1958 |
| 2,906,003 | Lakins | Sept. 29, 1959 |